United States Patent Office

2,954,388
Patented Sept. 27, 1960

2,954,388

PREPARATION OF TRIETHYLALUMINUM

John F. Nobis, Cincinnati, and Charles E. Frank, Kenwood, Ohio, and William F. McFadyen, Tuscola, Ill., assignors to National Distillers and Chemical Corporation, a corporation of Virginia No Drawing. Filed Jan. 18, 1957, Ser. No. 634,819

13 Claims. (Cl. 260—448)

The present invention relates to a process for preparation of triethylaluminum and, more particularly, to a process for reaction of sodium with ethyl aluminum halides under conditions to produce substantially pure triethylaluminum in relatively high yields.

Those skilled in the art are aware that alkylaluminum halides, i.e., mixtures of alkylaluminum dihalides and dialkyl aluminum monohalides can be produced from metallic aluminum and alkyl halides as, for example, in accordance with the following reaction:

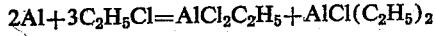

$$2Al + 3C_2H_5Cl = AlCl_2C_2H_5 + AlCl(C_2H_5)_2$$

Such a reaction is, for example, disclosed generically by Grosse and Mavity in the Journal of Organic Chemistry, 5 (1940), pages 106–121. Moreover, those skilled in the art are aware of disclosures, including the aforesaid Grosse and Mavity article, relating to direct preparation of dialkylaluminum halides by reactin of an alkyl halide with an aluminum-magnesium alloy or by treating the sesquihalide with an alkali metal in which case metallic aluminum is precipitated and the monoalkylaluminum compound is converted to the dialkyl aluminum halide. From such organoaluminum halides as, for example, ethyl aluminum chlorides including the aforesaid ethyl aluminum sesquihalides and diethylaluminum chloride, trialkylaluminum can be prepared by reacting the organoaluminum chloride with sodium. Thus, for such a conversion to trialkylaluminum, one method comprises the initial refluxing of alkylaluminum sesquichlorides with sodium ribbon followed by treatment of the resulting impure trialkylaluminum with a liquid sodium-potassium alloy, the latter treatment being essential as use of sodium alone, under the disclosed reaction conditions, becomes coated with a hard crust of by-product aluminum thereby preventing substantial completion of reaction and decreasing the rate of reaction.

The primary object of this invention is to provide a process carried out under controlled conditions whereby sodium is reacted with ethylaluminum halides to produce triethylaluminum in relatively high yields and substantially devoid of unreacted halides and/or undesired decomposition products of the ethyl aluminum halide reactant. Another object is the provision of such a process whereby to substantially completely react the ethylaluminum chloride to a large yield of the desired triethylaluminum product recoverable as a distillate without substantial, if any, contamination by unreacted ethylaluminum chloride or by-products thereof that may be formed in the reaction between sodium and the ethylaluminum chloride. A still further object is the provision of such a process that can be carried out in batch-wise, semi-batch-wise or continuous manner in which (1) the sodium-ethyl-aluminum chloride reaction is initially carried out to form the triethylaluminum followed by recovery of the latter or (2) simultaneously recovering the triethylaluminum product by distillation as it is formed in the sodium-ethylaluminum chloride reaction.

The process embodied herein comprises reacting sodium with an ethylaluminum chloride, and partly ethylaluminum sesquihalides, utilizing a controlled excess of sodium and a relatively high but controlled reaction temperature, i. e., above the melting point of sodium but below about 200° C. and, preferably, from about 130 to about 195° C. As is more specifically set forth hereinafter, practice of the process embodied herein results in rapid production of triethylaluminum in high yields and substantially pure form thereby making unnecessary the use of treatments, such as with a liquid sodium-potassium alloy and even with which lower yields of triethylaluminum are obtained than result from practice of this invention. Moreover, practice of this invention enables the production of substantially pure triethylaluminum in high yields by direct conversion of ethylaluminum sesquichlorides as prepared, and which can contain unreacted aluminum, thereby making it unnecessary to separate the sesquichlorides into individual components and utilize only the diethyl aluminum chloride for conversion to triethylaluminum.

With reference to the sodium reactant, the process embodied herein is carried out using an excess amount of sodium over that theoretically required to convert all of the ethylaluminum chloride to triethylaluminum but in an amount not substantially in excess of about 15% as higher amounts results in loss of yield, particularly due to formation of sodium complexes of triethylaluminum. In preferred embodiment, the sodium is used in an amount of from more than one to about ten percent in excess and preferably, from five to ten percent, over that theoretically required to convert the ethylaluminum chloride to triethylaluminum.

For preparation of triethylaluminum of substantially high purity and in high yields by the process embodied herein, the sodium reactant is desirably employed in a highly dispersed form, preferably as particles of less than about 50 microns in size. Thus, the sodium reactant can be used as a coating on finely divided particles of a solid that is inert to the reaction and, for example, as a coating on a substance that is a by-product (e.g., sodium chloride) of the reaction between the sodium and ethylaluminum chloride, as a coating on unreacted particles of aluminum from a process utilizing finely divided aluminum for preparation of the ethylaluminum chloride, etc. In specific embodiments, the sodium reactant is employed as a coating on finely divided particles of sodium chloride which may be preformed by agitating a mass of finely divided sodium chloride in mixture with sodium at a temperature above the melting point of sodium whereby molten sodium coats the sodium chloride particles, or molten sodium can be added to the reaction for formation of triethylaluminum in which case the sodium coats the by-product salt formed in the reaction. Thus, the process embodied herein can be started with preformed sodium-coated particles of an inert solid, examples of which include sodium chloride, sodium sulfate, sand, titania, zirconia, carbon, and others, or, as aforesaid, by in situ formation of finely dispersed sodium by addition of molten sodium to the reaction between sodium and the ethylaluminum chloride whereby the sodium coats the by-product salt as it forms in the reaction. In still other embodiments, the sodium can be used in the form of finely dispersed particles in an inert substance that is liquid under the reaction temperature employed. For such usage, inert substances such as mineral oils, waxes, etc. may be used which preferably have a higher boiling point than triethylaluminum whereby distillation of the reaction product for recovery of triethylaluminum is suitably effected without contamination with the dispersant medium for the sodium particles. For such an embodiment, the process can be started by use of a mass of finely divided sodium chloride or mixtures thereof with finely divided aluminum and adding thereto a high boiling liquid in which finely divided sodium is dispersed to provide a slurry to which the ethylaluminum chloride reactant is added. By such a method, the process is carried out under conditions of excellent heat transfer and highly desirable improved mixing and contact between the sodium and ethylaluminum chloride reactants.

As aforesaid, the process can be carried out as a batch or semi-batch operation in which the triethylaluminum is initially formed and recovered in a separate distillation step or in a simultaneous operation wherein the triethylaluminum is distilled as it forms. In the two step operation, the initial reaction is carried out at a temperature above the melting point of sodium, preferably above about 130° C. but at a temperature below about 200° C., followed by subjecting the reaction mixture to a temperature above about 190° C. but below about 200° C. to distill the triethylaluminum from the reaction mixture. On the other hand and in a preferred embodiment, the process is carried out at a temperature above about 190° C. but below about 200° C. in a reactor equipped with a distillation column whereby the triethylaluminum is distilled over as it forms.

In a batch-wise operation, the process embodied herein can be carried out by adding the ethylaluminum chloride to a closed reaction zone in which is present the sodium reactant in a form, for example, as a coating on finely divided particles of an inert solid and the reaction carried out at below about 190° C. followed by, upon completion of the reaction, distilling the triethylaluminum from the reaction mixture at above about 190° C. but below about 200° C. Preferably, however, the reaction is carried out in a reactor provided with a distillation column, at above about 190° C. but below about 200° C. whereby the triethylaluminum distills over as it is formed.

In a semi-batch operation, a mass of finely divided particles of a solid by-product from a previous reaction is admixed with sodium and the particles coated with sodium added as molten sodium, or by admixing the particles with sodium at a temperature above the melting point of sodium. The reaction is then carried out by addition of the ethylaluminum chloride and use of temperatures as defined in the aforesaid batch operation to either preform the triethylaluminum followed by distillation thereof, or to simultaneously distill the triethylaluminum as it forms.

In a continuous operation, using a reactor provided with a distillation column, sodium and the ethylaluminum chloride are continuously added through separate feed inlets into the reactor in which a temperature of above about 190° C. but below about 200° C. is maintained whereby the triethylaluminum is distilled off as it forms and by-products of the reaction are continuously removed from the reactor.

Irrespective of whether or not the process embodied herein is carried out in batch-wise, semi-batch-wise or continuous manner, a similar reactor can be employed equipped with an agitator designed to scrape the reactor walls and a distillation column. For the operations wherein it is desired to initially react the sodium and the ethylaluminum chloride and subsequently distill off the triethylaluminum product, cooling means are employed for the distillation column so as to prevent distilling off reaction product during ethylaluminum chloride addition to the reactor. Additionally, the reactor is provided with cooling means to cool the vessel walls for control of the reaction temperature during addition of the ethylaluminum chloride.

In order to more fully describe the invention, several embodiments thereof are set forth hereinafter along with several runs carried out under conditions of temperature and/or sodium:ethylaluminum chloride concentrations outside the scope of the process embodied herein for purposes of comparison to illustrate the marked improvement in product yield of improved quality provided by practice of this invention.

In the examples set forth hereinafter, and for purposes of illustration and not limitation, ethylaluminum sesquichlorides were employed that were prepared as follows:

PREPARATION OF ETHYLALUMINUM SESQUICHLORIDES

To a one liter, three-neck, round bottom flask equipped with a metal sweep stirrer, metal thermometer, condenser and gas inlet tube, the following was charged: 600 grams aluminum pellets and 0.1 mole of ethyl sesquichlorides (catalyst). The stirred flask was externally heated to bring the temperature up to 90° C. and ethyl chloride gas was charged into the flask through a calibrated rotameter. The reaction was very exothermic and a cooling bath was necessary to maintain the temperature between 90° C. and 120° C. Absorption of the ethylchloride was very rapid and feed rates varied between 0.2 l./min. to 0.5 l./min. depending upon the temperature. The percent absorption was determined from the measured "off-gases." The gas feed was continued until the reactor was full and then the product was pumped from the reactor through a screened decanting leg using dry nitrogen pressure. A production rate of 0.15 lb./hour was realized. The yield was 90% based on ethylchloride charged and 94% based on aluminum used.

Analysis of the sesquichlorides showed the chloride content to be 41–43% (theory=43%); and the aluminum content analyzed between 20–21% (theory=21.8%), thus indicating that the ratio of the ethylaluminum dichloride to diethylaluminum chloride was about 1:1.

Example 1

This example illustrates that a reaction of the type embodied herein but in which an excess of sodium is not used results in production of triethylaluminum which, though obtained in relatively high yield, is contaminated by a relatively high amount of by-product chlorides.

A three-liter, three-necked, round bottomed, flask equipped with an anchor-type stirrer, a thermometer, a graduated dropping funnel, a condenser, and a receiver was charged with 200 grams of salt and 5.48 gram atoms of sodium. The vessel contents were heated to 110° C. to melt the sodium, following which the agitator was started whereby the sodium coated the dry salt thus forming sodium-coated particles in the range of 1–20 microns. A stoichiometric quantity (1.82 moles) of ethylaluminum sesquichlorides was then slowly added over a 60 minute period while the vessel contents were held at a temperature of 150–180° C. by use of a cooling bath, and the condenser was maintained sufficiently cool to prevent distillation of by-product triethylaluminum (B.P. 190–195° C.) before addition of the sesquichloride was complete. When such addition was completed, the condenser was replaced with a small Vigreaux column and 84% of triethylaluminum (based on the sesquichlorides) was recovered by distillation. The recovered crude product was contaminated with about 11% of unreacted sesquichloride.

Example 2

A run was carried out, in a two gallon jacketed metal reactor, in the manner of Example 1 except that a 5% excess (16.4 gram atoms) of sodium was used, the temperature of the vessel contents following sodium addition was raised to above 100° C. to melt the sodium, and the ethylaluminum sesquichlorides were added over a two hour period while maintaining the vessel contents at 160–180° C. An 83% yield of triethylaluminum containing only 1.5% chlorides was obtained by distillation.

Example 3

A run was carried out in the manner of that of Example 1 except that the vessel was charged with 5.05 gram atoms of sodium (13% excess) following which the sodium was melted. To the molten metal, 1.68 moles of ethylaluminum sesquichlorides were added over a 60 minute period while the temperature of the vessel contents were maintained at 150–180° C. during sesquichloride addition. From this run, in which a 13% excess of sodium was used, triethylaluminum was obtained in an 85% yield. The product triethylaluminum was of excellent purity characteristics as it contained only a relatively low content of 0.7% of by-product chlorides.

Example 4

The runs in this example illustrate that use of temperatures higher than embodied for the present process result in relatively high concentrations of chlorides in the triethylaluminum product.

A run was carried out in the manner of Example 2 but in which the reaction vessel was charged with 8.7 gram atoms of sodium and heated to above 100° C., thereby melting the sodium. While maintaining the vessel contents at 175–275° C., ethylaluminum sesquichlorides were slowly added (2.5 moles) over a two hour period. From such a reaction, in which the sodium was used in a 16% excess, only a 24% yield of triethylaluminum was obtained by distillation.

This example was repeated but with use of 14.9 gram atoms of sodium and 4.45 moles of ethylaluminum sesquichlorides (12% excess Na) and a reaction temperature of 170–250° C. Triethylaluminum in only a 65% yield and containing 7% chlorides was obtained.

Example 5

A run was carried out in the manner described in Example 1 except that the vessel was charged with 5.65 gram atoms of sodium. To the vessel contents, 1.68 moles of ethylaluminum sesquichlorides were added slowly at 130–195° C. From such a reaction, in which the sodium was used in a 1.2 % excess, an 85.3% yield of triethylaluminum was obtained by distillation, said product having the relatively low chloride concentration of only 0.5%.

Example 6

The following tabulation sets forth conditions employed and product yield from a run carried out in accordance with the process embodied herein and in which run, carried out in semi-continuous operation over a 20 day period, a twenty gallon reactor was employed provided with a rugged agitator that swept the bottom of the vessel and scraped the wall surfaces. The vessel was provided with a jacketed distillation column supplied with hot and cold coils, an inlet for feeding molten sodium, two sesquichloride feed inlets and a screw take off for removing by-product salt and aluminum.

| Total Sodium | | By-Product Salt-Aluminum formed in reactor, lbs. | Total Ethyl Sesquichlorides Addition, lbs. | Addition Time for Sesquichlorides, hrs. | Temperature during Sesquichloride Addition, °C. | Percent Yield of Triethyl Aluminum | Percent Cl in Triethyl Aluminum |
|---|---|---|---|---|---|---|---|
| Added, lbs. | Percent excess | | | | | | |
| 56 | 7 | 135 | 190 | 150 | 175–195 | 88 | 0.03 |

While there are above disclosed but a limited number of embodiments of the process of the invention herein presented, it is possible to produce still other embodiments without departing from the inventive concept herein disclosed, and it is desired therefore that only such limitations be imposed on the appended claims as are stated therein.

What is claimed is:

1. A process for preparation of triethylaluminum which comprises reacting ethylaluminum chloride with finely-divided, high surface sodium in an amount in excess, but not substantially more than about a 15% excess, of the amount of sodium theoretically required to convert said chloride to triethylaluminum, at a temperature above the melting point of sodium but below about 200° C.

2. A process, as defined in claim 1, wherein the sodium reactant is in the form of finely dispersed particles of sodium.

3. A process, as defined in claim 1, wherein the sodium reactant is in the form of a coating on finely divided particles of a solid inert to the reaction between ethylaluminum chloride and sodium.

4. A process, as defined in claim 3, wherein the inert solid is sodium chloride.

5. A process, as defined in claim 1, wherein the ethylaluminum chloride and sodium are reacted at a temperature above the melting point of sodium but below about 200° C. while preventing the distillation of triethylaluminum from the reaction mixture, and the resulting reaction mixture is subsequently subjected to a temperature of from above about 190° C. but below about 200° C. to distill off the triethylaluminum.

6. A process, as defined in claim 1, wherein the ethylaluminum chloride and sodium are reacted at above about 190° C. but below about 200° C. while simultaneously distilling off the triethylaluminum as it is formed.

7. A process for preparation of triethylaluminum which comprises reacting ethylaluminum sesquichlorides with finely divided sodium in an amount in excess, but not substantially more than about a 15% excess, of the amount theoretically required to convert said sesquichlorides to triethylaluminum, at a temperature above the melting point of sodium but below about 200° C.

8. A process, as defined in claim 7, wherein the sodium reactant is in the form of particles of less than about 50 microns in size and the reaction is carried out at a temperature above about 190° C. but below about 200° C. while simultaneously distilling off the triethylaluminum as it forms by reaction between sodium and the sesquichlorides.

9. A process, as defined in claim 7, wherein the sodium reactant is in the form of particles of less than about 50 microns in size, the reaction is carried out at a temperature below about 200° C. while preventing distillation of triethylaluminum from the reaction mixture, and subsequently distilling off the triethylaluminum by subjecting the reaction mixture to a temperature of above about 190° C. but below about 200° C.

10. A process, as defined in claim 7, wherein the sodium reactant is in the form of a coating on finely divided particles of a solid, inert to reactants and products, and the triethylaluminum is distilled as it forms by reaction of the sodium with the sesquichlorides.

11. A process, as defined in claim 7, wherein the sodium reactant is in the form of a coating on finely divided particles of sodiumchloride and the triethylaluminum is distilled as it forms by reaction of the sodium with the sesquichlorides.

12. A process for preparation of triethylaluminum which comprises reacting ethylaluminum chloride with an excess of sodium of up to about 15% dispersed in an inert medium at a temperature between about 190° and 200° C. while simultaneously distilling off the triethylaluminum as it is formed, said inert medium being liquid at the reaction temperature employed.

13. A process, as defined in claim 12, wherein the inert medium is mineral oil.

References Cited in the file of this patent

UNITED STATES PATENTS 2,838,556    Cottle _____ June 10, 1958

FOREIGN PATENTS 535,085    Belgium _____ July 22, 1955

OTHER REFERENCES

Grosse and Mavity: J. Organic Chemistry, 5 (1940), pp. 119 and 120.

Industrial and Engineering Chemistry, August 1951, pp. 1759 and 1760.